United States Patent

Kane et al.

[15] 3,695,576
[45] Oct. 3, 1972

[54] REINFORCED BOOT FOR SLURRY TYPE PINCH VALVE

[72] Inventors: Robert R. Kane, Marshalltown, Iowa; Charles J. Glaser, Jr., Lafayett Hill, Pa.

[73] Assignee: Fisher Controls Company, Inc., Marshalltown, Iowa

[22] Filed: Jan. 12, 1970

[21] Appl. No.: 2,076

[52] U.S. Cl. .................................. 251/5, 138/132
[51] Int. Cl. .................................................. F16k 7/07
[58] Field of Search ................................ 251/4–10; 138/124–127, 137, 132

[56] References Cited

UNITED STATES PATENTS

| | | |
|---|---|---|
| 3,528,457 | 9/1970 | Martin et al. ............... 138/137 |
| 3,443,609 | 5/1969 | Wehren ...................... 251/5 X |

FOREIGN PATENTS OR APPLICATIONS

| | | |
|---|---|---|
| 1,038,357 | 9/1958 | Germany ...................... 251/8 |
| 1,140,120 | 2/1957 | France ........................ 138/132 |
| 437,318 | 10/1935 | Great Britain ............... 138/137 |

*Primary Examiner*—M. Cary Nelson
*Assistant Examiner*—Richard Gerard
*Attorney*—Paul M. Denk, John D. Upham and Harold R. Patton

[57] ABSTRACT

In a slurry type pinch valve for use in controlling the flow of materials, the valve is formed from various plies of a resilient composition, such as elastomer material, and embedded within the plies of said composition are one or more plies of fabric which contains reinforcing cords that are arranged approximately parallel within each ply, but which cords are free from contiguous contact with each other; at least one ply of the fabric has cords maintained longitudinally of the valve, and the ends of said ply are turned approximately perpendicularly to provide for their integral embedment within the elastomeric formed flanges provided at each end of the valve. This valve may be used in conjunction with a pair of valve actuators that are disposed diametrically approximate the midpoint of the valve, so that each actuator is capable of simultaneously compressing the valve approximately half of its diameter to curtail flow of materials therethrough.

In the process of forming said valve, at least one ply of the elastomeric composition is wound around a core, the ply of fabric having cords maintained longitudinally of the valve is subsequently wound around said first ply, and then additional plies of elastomeric composition and of fabric having cords aligned circumferentially of the valve may be wound around said core to complete the valve; the extended ends of the longitudinally corded fabric are turned for disposition intermediate a pair of elastomeric annuluses provided at each end of the valve, and then the entire fabricated valve is placed within a mold and heated to cure the valve into an integral unit.

8 Claims, 3 Drawing Figures

3,695,576

PATENTED OCT 3 1972

INVENTORS
ROBERT R. KANE
CHARLES J. GLASER, JR.
BY
Paul M. Denk
ATTORNEY

INVENTORS
ROBERT R. KANE
CHARLES J. GLASER, JR.
BY Paul M. Denk
ATTORNEY

REINFORCED BOOT FOR SLURRY TYPE PINCH VALVE

BACKGROUND OF THE INVENTION

This invention relates generally to a valve for controlling the flow of slurry materials, and more particularly, relates to a valve that is disposed intermediate a pair of valve actuators, which valve is reinforced with aligned, noncontacting cords or strands embedded within the valve which during functioning of the valve are generally free from exposure and eliminate shearing forces.

In the control of the flow of slurry materials, and particularly slurry materials which contain constituent small particles or aggregates, it is difficult to provide for precise shut off or curtailment of flow due to the presence of the aforesaid added ingredients. Essentially, valves that have been utilized to regulate the slurry flowing process have been of the pinch valve category, wherein the valve is constructed of a resilient type material, with the operation of a pinching mechanism for use in compressing said valve into closure, thereby cutting off the flow of the slurry material. Most of the mechanisms utilized in the prior art to deform the valve into closure have been of the type that generally operate through the use of a solenoid to either extend or retract an arm that squeezes the valve into closure. Furthermore, prior valves have generally been constructed of a singular material such as rubber, or rubber-like material, which type valves after repeated usage are susceptible to fracture or fatigue causing the valve to split and cause failure. This problem is generally present in those types of valves that utilize a squeezing mechanism that pinches the valve into closure by compressing only one side wall of the valve until it achieves contiguous contact with the opposite, undistorted wall of the valve. Obviously, this means for accomplishing closure results in total deformation of the resilient valve, and repeated closings of the valve in this manner can only lead to its rapid fatigue and failure.

There have been attempts to alleviate this problem of fracture in resilient valves, and the most uniform procedure thus far followed is to construct the pinch valve in the form of a laminate, including a fabric layer or ply intermediate a series of laminated rubber plies, which fabric tends to reinforce the valve against fracture due to repeated distortions as during closure. The use of such means for reinforcing the valves has been effective in prolonging the useful life of such valves, but it has been found that a reorientation of the type and disposition of reinforcement used in the laminated valves can still further enhance the usefulness of the pinch valve. A summary of this invention, next following, will describe the merits of this invention in achieving this result.

It is the principal object of this invention to provide a reinforced boot for use within a slurry type pinch valve, said boot or resilient valve containing reinforcing cords or strands that reduce the incident of shear usually encountered by reinforcing fabric within such valves.

It is another object of this invention to provide a pinch valve wherein at least one reinforcing ply of the valve contains approximately parallel longitudinal cords throughout the length of the valve to enhance its working strength.

It is a further object of this invention to provide a reinforced pinch valve which contains longitudinal strands throughout its length, which strands are further turned for integral embedment within the flanges of the valve thereby lessening the occurrence of its fatigue proximate the location of the integral connection of the valve and its end flanges.

It is a further object of this invention to provide a reinforced pinch valve wherein certain of its reinforcing cords are arranged approximately parallel circumferentially of said valve to decrease the likelihood of longitudinal fracture along the length of the valve.

It is still another object of this invention to provide a reinforced pinch valve which is formed from various plies of resilient material that integrally contain reinforcing cords, in which no two reinforcing cords are in contiguous contact, touching each other.

It is yet another object of this invention to provide a reinforced pinch valve having incontiguous reinforcing cords, and wherein the valve has a pair of diametrically arranged actuators each of which only needs to deform the valve one-half of its diameter to provide for its sealing closure and curtailment of flow of the slurry material therethrough.

It is still another object of this invention to provide a method for forming a reinforced pinch valve as a series of plies of resilient material and reinforcing cords, and which plied material is subsequently molded and cured through heat into an integral resilient flanged valve.

It is an additional object of this invention to provide a pinch valve which may be easily constructed, and is economical in use since it is made for prolonged and sustained operation.

These and other objects of this invention will become apparent to those skilled in the art in light of the following disclosure and drawings.

SUMMARY OF THE INVENTION

This invention contemplates the formation of a pinch valve wherein, as previously remarked, none of its reinforcing cords or strand are in contact with each other. In a pinch valve wherein the valve actuator deforms the resilient valve to compress it into closure, at that point where the actuator stem forces its shoe to deform the valve and pinch it into closure, significant pressure and forces are exerted upon the valve at the precise location where it is contacted by said shoe. Obviously, where a thickened or rapidly moving slurry material is moving through the valve, the amount of force acquired for the shoe to deform the valve into closure may be excessive, at least in proportion to the thickness and size of valve being employed, and there is a tendency, in most valves, when repeatedly distorted into closure, to fracture or fail at this location. To alleviate this problem, as previously described, many valve manufacturers reinforce the resilient material of the valve with a fabric that has a tendency to lessen fatigue, but it has been found that where fracture due to repeated distortions may be delayed due to the presence of the reinforcing fabric, the fabric itself has a tendency to break particularly in the vicinity where the actuator shoe exerts a heavy impact force to pinch the valve into closure. This breaking or tearing of the fabric has been found to be caused as a result of a type of mutual shearing forces that the contiguous crisscrossing strands of the reinforcing fabric exert upon each other under the pressure of the actuator shoe. One learned in the construction of reinforcing fabrics knows that in the weaving of such fabrics the strands are generally arranged, as in most cloth, at 90° angles to each other and are interwoven within each other. Thus, crossing strands are in contact one above each other, and when pressure is exerted upon, for example, an upper strand, it will be forced not only into close contact with the underlying strand, but will likewise squeeze the strands together causing their weakening and eventual tearing or breaking under the repeatedly applied pressure and distortion of the actuator shoe. To alleviate this problem, the present invention contemplates the arrangement of reinforcing cords or strands within the resilient material of the pinch valve in a manner in which no two reinforcing cords are in contact with each other. To achieve such, at least one layer or ply of the cords are arranged approximately parallel and longitudinally throughout the length of the valve. In another ply or plies of the pinch valve, there are located additional reinforcing cords that are also arranged somewhat parallel to each other and disposed circumferentially of the resilient valve. Neither the reinforcing cords arranged longitudinally of the valve nor those contained circumferentially of the valve are in contact with each other, and therefore, when any pressure is exerted upon the pinch valve by its actuator shoe or shoes, the reinforcing strands cannot exert a shearing force upon each other as occurs in pinch valves constructed containing the standard type reinforcing fabric. Obviously, the reinforcing cords arranged longitudinally of the valve are useful in preventing or delaying fracture or failure of the valve as a result of cracks that could form circumferentially of said valve, and the strands or cords that are arranged circumferentially of the valve are useful in delaying fatigue of the valve due to cracks that generally orient themselves longitudinally of the valve. Thus, a valve constructed with these type reinforcing strands is strengthened against fatigue from cracks or splits that may develop in the resilient material in any direction, and the reinforcing cords themselves are devoid of exposure to the shearing forces that could be induced secondarily by means of the pressure exerted by the actuator shoe while deforming the valve into closure. Under this arrangement the only forces that are exerted upon the reinforcing strands, both longitudinally and circumferentially arranged, are the tension forces developed while the pinch valve is deforming into closure.

Another area where fatigue is likely to occur in pinch valves constructed of resilient material is at the location where the longitudinal length or cylindrical embodiment of the valve connects with its integral end flanges. Obviously, if this type of a valve is to be inserted within any length of a flow line or pipe line that is used to transfer materials, the pinch valve itself must contain some form of flanged end connectors so that the valve may be hermetically, or at least, leak-proof connected to the pipe lines located proximate to each of its ends. Usually, for economic reasons, the pinch valve is not constructed to any length greater than that required to allow its walls to be distorted into closure, and for this reason, there is usually some bending that yet occurs proximate that location where the valve walls are integrally molded or connected to its flanges. Repeated distortions of the valve into closure naturally cause continuous distortion of the valve proximate to this area of connection to its flanges. To alleviate this problem, this invention includes the integral molding of its longitudinal reinforcing cords into the flanges at each end of the valve, so that these cords will provide the means for preventing circumferential cracking or failure of the valve proximate these corner locations.

Since the main reason for failure of a pinch valve is due to its distortion into closure, it is further contemplated that the pinch valve of this invention may be utilized in combination with a pair of valve actuators that may be arranged diametrically opposite to either side of the valve with each actuator shoe only being depressed approximately one-half the diameter of the valve to compress it into closure. Under this arrangement, the distortion of the valve is only one-half that which occurs when only one valve actuator is used in combination with a pinch valve, as is commonly done in the prior art. This reduces the incident of failure due to circumferential fracture or wear and tear upon the valve. Furthermore, this reduction in the amount of distortion of the valve lessens the likelihood that the valve will tear at the location where the body of the valve joins with its flanges at each of its ends.

DESCRIPTION OF THE PREFERRED EMBODIMENT

Figure 1:
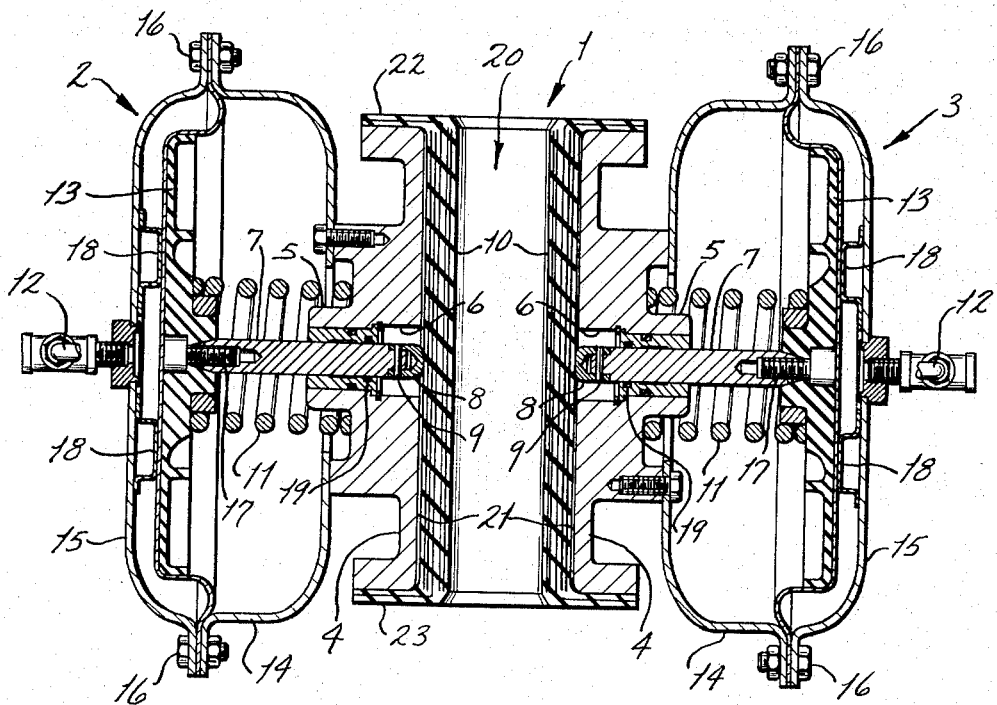
FIG. 1 is a sectional view of a pair of diametrically arranged valve actuators disposed to either side of the reinforced valve of this invention.

Referring now to the drawings for one illustrative embodiment of the slurry type pinch valve of this invention, in FIG. 1, reference numeral 1 generally depicts the reinforced valve of this invention, such a valve generally being referred to in the trade as a boot, said valve shown disposed intermediate a pair of valve actuators 2 and 3, which actuators are normally maintained at rest allowing the valve 1, as shown, to be sustained open to provide for the flow of any slurry or other type material therethrough, as during its continuous flow through a pipe line. Although it is stated that this invention is to be primarily used in conjunction with a slurry, or an abrasive type slurry, for use in controlling or curtailing its flow through a pipe line, it should be readily apparent that such a valve may be just as easily utilized to control the flow of any other type chemicals, natural gas, or any wide variety of fluids, abrasive or nonabrasive in nature, through a pipe line. This type of valve is of the straight-flow through type valve, which is designed to provide for streamlined flow of materials therethrough, so as to minimize the impact or its resistance to abrasive particles upon the valve's inner walls as the slurry material flows therethrough. It has been generally found that valves of this nature may be constructed of natural or synthetic reinforced rubber, but it is likely that other types of elastomers, or plastics, may be utilized in the construction of such a valve depending upon the nature and type of flowing material it is designed to accommodate.

The valve actuators 2 and 3 are identical in construction, and each valve is provided with a body portion 4 that is constructed semicylindrical so as to be maintained in contiguous or proximate contact over approximately one-half of the outer surface of the valve 1. Each body portion is formed having a boss 5 proximate its center so as to accommodate through its central opening 6 the stem 7 of the actuators. Each stem is formed having a shoe 8 connecting to its end by means of a pin 9, and it is these shoes that act to depress the proximate walls 10 of the valve into closure when it is desired to curtail the flow of the slurry material therethrough. The stems 7 and shoes 8 of the actuators are normally withdrawn from its pressure contact against the walls 10 of the valve by means of the spring 11, but when it is desired to employ the shoes in closing the valve, air under pressure will be admitted into each fitting 12 and exert pressure upon the diaphragm 13 resulting in a forced projection of the stems 7 against the walls 10 of the valve 1. Each valve actuator is sturdily constructed having a casing 14 and a lower casing 15 which are hermetically sealed at the location of their joining by means of a series of fasteners 16. As shown, each stem 7 connects with the diaphragm by means of a fastener 17, and stops 18 limit the extent to which the diaphragm and its stem will withdraw from its contractual relationship with the valve. A series of O-rings, as at 19, maintain a sealed relationship with regard to the movement of each stem within its boss.

The valve 1 is formed having a cylindrical like body portion 20, formed having the walls, as at 10, in close proximity to the body portion 4 of the valve actuators, but generally, a slight amount of space, as at 21, will be maintained intermediate the walls 10 and the vale body 4 to provide some clearance. Each end of the cylindrical valve body 20 is formed having and integral flange 22 and 23 which generally mate with the flange portions of the body 4 so that when the conduit or flow pipes (not shown) connecting axially to either end of the valve 1 are arranged in place, a bolt or other fastener may be tightened between the flanges of the body 4 and said flow pipes to tightly compress the elastomer flanges 22 and 23 of the valve sealed therebetween. Thus, a leak proof seal is formed intermediate the flow pipe and the valve in this manner.

Figure 2:
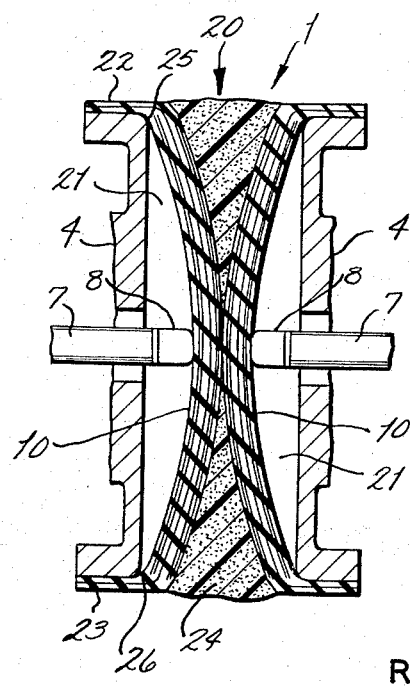
FIG. 2 provides a fragmentary sectional view of the valve of this invention as disclosed in FIG. 1, showing said valve being compressed into closure by the shoes of the valve actuators.
Figure 3:
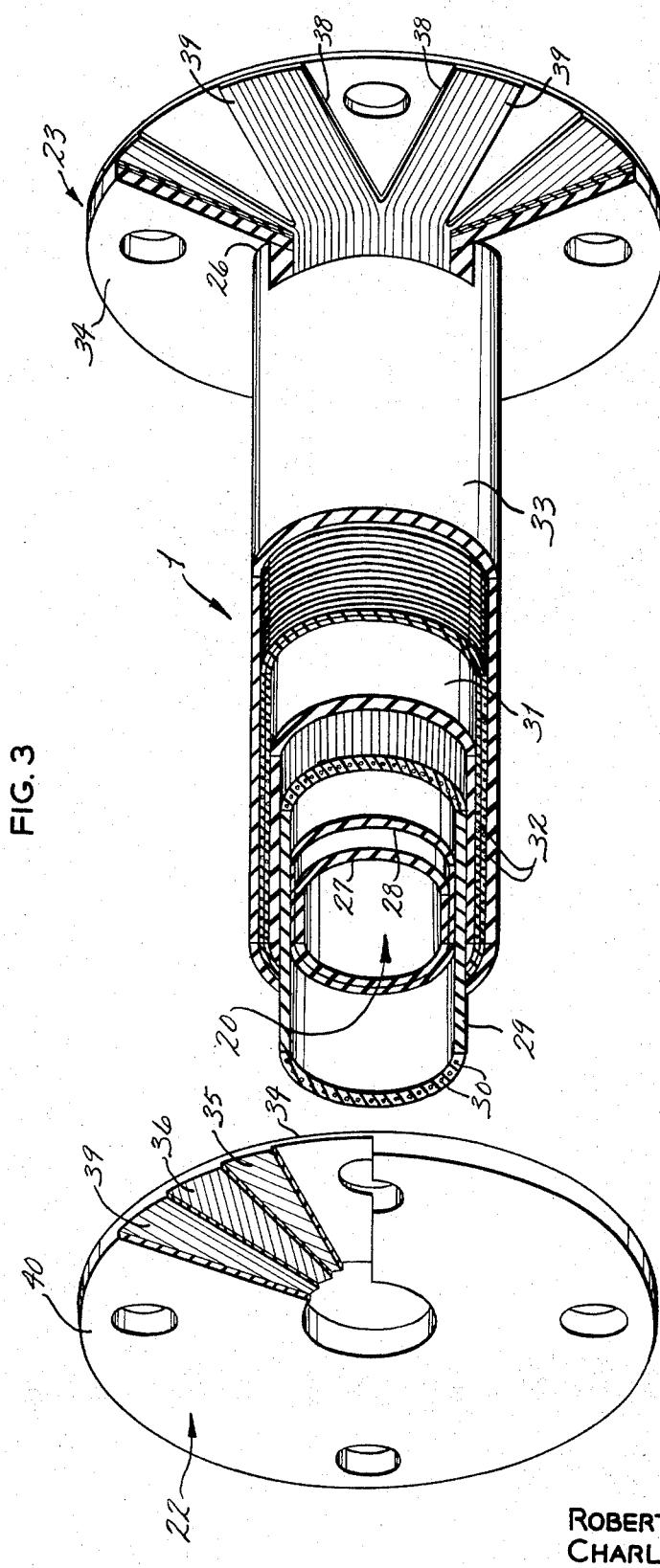
FIG. 3 is a multi-sectional view of the valve of this invention, with the normally integral flange at one end shown removed from said valve.

As disclosed in FIG. 2, the valve actuators are disposed for projecting into the recess or cavity 21 within the body 4 of the actuators, wherein their shoes 8 press against the walls 10 of the body 20 of said valve causing their distortion into closed contact to prevent the further flow of any slurry material, as depicted at 24, therethrough. As previously described, the shoes 8 exert a reasonable amount of force when pinching the walls 10 into contiguous contact, and for this reason, there is a tendency for the walls of the valve, proximate this area, to be pressed tightly intermediate said shoes. Hence, fatigue and eventual rupture of the valve is very likely to occur at this location. In addition, it will be noted that at the location where the walls 10 integrally connect with the flanges 22 and 23 of the valve, and these locations may be more appropriately called the corners 25 and 26, the likelihood of rupture of the valve eventually at these locations is also present. For these reasons, and by referring to FIG. 3, the valve 1 is disclosed as being constructed of multiple plies of an elastomer which is reinforced by preoriented cords to enhance its strength. As shown, the valve 1 contains an inner surface formed from at least one or more layers, as at 27 and 28, of an elastomer-like material, preferably of resilient rubber or the like depending upon the type of slurry or other material designed to flow therethrough, with a further ply of a fabric 29 having reinforcing cords, as at 30, maintained longitudinally of said valve 1. These cords are aligned approximately parallel to each other throughout the length of the valve, and although they are shown lineally arranged in this embodiment, they may also be arranged slightly angular or have other curving characteristics provided that they do not overlap into contact with each other. As previously discussed in this application, valves that have been constructed and reinforced through the use of a fabric formed from interwoven cords have a tendency to fatigue after repeated usage due to the pressure exerted by the two shoes 8 of each valve actuator as they compress the walls of the valve into contiguous and tight contact. Overlapping strands of reinforcing fabric have a tendency to develop a mutual shearing force, or crushing force, which after repeated applications tend to weaken the proximate strands causing their eventual tearing or breaking. Once this occurs, it is only a matter of time until the various plies of elastomer also crack, eventually rupturing the valve and rendering it useless. A further ply 31 of an elastomer, having a Durometer hardness within the vicinity of 45 to 50, circumferentially covers the longitudinal reinforcing layer 29, and disposed upon this ply 30 is one or more layers 32 of a reinforcing fabric having cords which are disposed only circumferentially of the valve. These cords, as with the cords contained in layer 29 of the valve, are incontiguous with each other, and therefore, do not exert a shearing or crushing force upon each other when subjected to the pressure and forces of the shoes 8 during operation of each valve actuator. Finally, an outer layer or ply 33 of an elastomer is disposed around the valve to form its exterior surface. This exposed layer of elastomer should be of sufficient toughness, and a Durometer hardness around 60 has been found satisfactory. The various thickness or the number of layers of the elastomers or plies or reinforcing fabrics will depend upon the thickness and size of the valve desired. Hence, for the design of smaller valves, only one layer of each of the foregoing compositions may be used, whereas for a thicker valve, multiple layers of the various elastomers and reinforced fabrics may be employed. These reinforcing fabrics are designed having the cords arranged and held in place by any type of filler composition, such as a heat setting rubber compound, rubber that may provide at least sufficient supporting strength to allow the cords to be properly arranged within the valve during its fabrication. Each end of the valve is formed having its integral flanges 22 and 23 which are identical in construction, and which are formed having a first annulus 34 which during construction of the valve is placed into close contact with the ends of the various plies of the cylindrical portion 20 of the valve, and additional layers of reinforcing fabric, as at 35 and 36, are next disposed in place superimposed upon the annulus 34, with the fibers or strands of these layers being maintained angularly with respect to each other so as to increase the strength of the valve and its flanges.

To add further strength to the valve, especially proximate that location where the valve forms the corners 25 and 26 between the valve's cylindrical body 20 and its flanges, the reinforcing fabric 29 containing the longitudinal cords 30 extends beyond the ends of the cylindrical body of the valve and is slitted, as at 38, so that its now integrally formed tabs 39 may be turned approximately 90° to be molded within each flange 22 and 23. Hence, with the longitudinal cords 30 being inherent in the formation of the corners between the body portion 20 and the flanges of the valve, these cores will enhance the strength of the valve proximate these corners so that they will be reinforced against the repeated distortions by the actuators, with these cords preventing rupture of the valve proximate these locations. Finally, each flange is formed having an outer annulus 40 which forms the outer surface of the flange.

In forming the valve of this invention, the inner plies 27 and 28 or more, are wound around a core (not shown) of a length greater than the overall length of the pinch valve. Where these plies are constructed of an elastomer which is nontacky or adhesive in nature, a thin ply of a tie-gum may be disposed intermediate each ply so that upon heating and curing of the valve, all of these plies may become chemically and integrally bonded. The length of the plies 27 and 28 are equal to the length of the valve being constructed, and extend approximately to the outer surfaces of the flanges 22 and 23. Next, a spiral splice of the longitudinally corded fabric 29 is wrapped around the ply 28 so that at least one layer of this reinforcing fabric is provided. The length of this particular ply exceeds the overall length of the finished valve, and will be of at least a sufficient length to provide for the cutting of its ends into tabs that can be turned and extend into the flanges and into proximity with their peripheral edges. Following this, an additional layer 31, or more layers, of the elastomer is wrapped around the longitudinal corded fabric 29, and the length of this layer is equal to or very slightly less than the length of the cylindrical body portion 20 of the valve, this length not to exceed the distance intermediate the inner surfaces of the flanges 22 and 23 of said valve. The reason for maintaining the shorter length of this ply, and the additional plies to be wound around the core, is to prevent them from becoming conjested proximate the corner portions 25 and 26 of the valve as it is squeezed distorted into contact by means of the valve actuators. One or more layers 32 of the fabric having reinforcing cords disposed circumferentially of the valve are now wound around the elastomer layer 31, and the strength of the valve to be acquired may be controlled by the number of layers or plies of this fabric wound around the core. Finally, an outer layer 33 of an elastomer is wound around the core to complete the formation of the cylindrical body portion 20 of the valve. When the valve has been completed to this stage, it is then pressed tightly into a mold that has an internal diameter slightly less than the outside diameter of the cylindrical body portion of the valve thus far formed, so that when the completed valve is heated and cured, the pressure exerted by the mold will effect complete vulcanization or curing of the various layers of the elastomer with the reinforcing fabric, maintaining the fabric in proper orientation throughout the length of the valve, and bonding the valve into an integral unit. It is desirable to utilize a mold (not shown) that is formed having open flange molds proximate each end, and into each flange mold there is inserted an elastomer annulus 34 followed by insertion of one or more plies 35 and 36 of the reinforcing fabric. Following this, the cut ends of the longitudinally reinforced ply 29, which have been formed into the tabs 39, are bent at approximately a 90° angle into contact with the ply 36, all around the surface of the flange, and finally an elastomer annulus 40 is inserted into the mold flange. An outer mold plate (not shown) is inserted in place, one being tightened against each end of the valve flanges.

Where the valve is constructed primarily of rubber composition, it has been found effective to cure the fabricated valve, as contained within its mold, for approximately 2 hours at 290°F. Following this, the mold may be removed from the valve, and the valve is now constructed as an integral unit, properly vulcanized, and is ready for use in combination with its actuators in the flow line of a slurry material.

It has been found useful to utilize reinforcing cords that are constructed as fibers of Nylon, Rayon, Dacron, or the like, and where the inside diameter of the valve is of small dimensions, it would even be possible to utilize certain metallic strands in these reinforcing plies of said valve. Furthermore, at the area where the shoes of the actuator contact the walls 10 of the valve, a strap of reinforcing material may be wound around the valve proximate this location to provide further reinforcement for the valve. In addition, although the valve of this invention has been described as formed cylindrically in shape, it is likely that valves of other cross section, such as elliptical or the like may be formed in the valve.

Numerous variations in the construction of the valve of this invention as used in combination with the pair of valve actuators may occur to those skilled in the art in the light of the foregoing disclosure and claims. For example, the arrangement of the various plies of reinforcing fabric and elastomers contained in both the cylindrical body portion 20 and the flanges 22 and 23 of the valve may be interchanged as found expedient during formation of said valve. The foregoing disclosure is merely illustrative.

Having thus described the invention, what is claimed and desired to be secured by Letters Patent is:

1. In a reinforced pinch valve for use in controlling the flow of materials therethrough, said valve being formed of a resilient composition capable of being compressed to curtail flow of material therethrough, said valve capable of reacquiring its initial integrity after discontinuance of compression, a series of reinforcing cords of which select cords are arranged approximately parallel to each other being embedded within said resilient composition, said parallel reinforcing cords being free of contiguous contact with each other thereby reducing the incidence of their mutual shear when the valve is compressed to curtail flow of materials therethrough, certain of said reinforcing cords being arranged longitudinally of the valve, the remaining of the approximately parallel reinforcing cords being arranged circumferentially of said valve, said valve being formed having flanged ends, each flanged end of the pinch valve comprising a first elastomeric annulus, the incontiguous cords arranged longitudinally of the valve extending through said annulus and being turned and maintained contiguous with the surface of said annulus, a second elastomeric annulus being integrally connected to said first annulus, at least one fabric reinforced annulus disposed intermediate the first and second elastomeric annuluses, said second elastomeric annulus being integrally connected to said first elastomeric annulus thereby embedding the turned portion of said longitudinal cords and the fabric annulus integrally into a flange.

2. In a reinforced pinch valve for use in controlling the flow of materials therethrough, said valve being formed of a resilient composition capable of being compressed to curtail flow of material therethrough, said valve capable of reacquiring its initial integrity after discontinuance of compression, a series of reinforcing cords of which select cords are arranged approximately parallel to each other being embedded within said resilient composition, said parallel reinforcing cords being free of contiguous contact with each other thereby reducing the incidence of their mutual shear when the valve is compressed to curtail flow of materials therethrough, certain of said reinforcing cords being arranged longitudinally of the valve, the remaining of the approximately parallel reinforcing cords being arranged circumferentially of said valve, said valve being formed having flanged ends, each flanged end of the pinch valve comprising a first elastomeric annulus being located proximate the ends of the resilient composition forming the valve, the incontiguous cords arranged longitudinally of the valve extending through said annulus and being turned and maintained contiguous with the surface of said annulus, and a second elastomeric annulus being integrally connected to said first annulus, a pair of fabric reinforced annuluses disposed intermediate the first and second elastomeric annuluses, the strands of one fabric annulus being disposed annularly with respect to the strands of the second fabric annulus, and said second elastomeric annulus being integrally connected to said first elastomeric annulus thereby embedding the turned portion of said longitudinal cords and the pair of fabric annuluses integrally into a flange.

3. In a reinforced pinch valve for use in controlling the flow of materials therethrough, said valve being formed of a resilient composition capable of being compressed to curtail flow of materials therethrough, said valve capable of reacquiring its initial integrity after discontinuance of compression, a series of reinforcing cords of which select cords are arranged approximately parallel to each other being embedded within said resilient composition, the parallel reinforcing cords of the valve being free of contiguous contact with each other thereby reducing the incidence of their mutual shear when the valve is compressed to curtail flow of materials therethrough, certain of said parallel reinforcing cords being arranged longitudinally of the valve, the remaining of the approximately parallel reinforcing cords being arranged circumferentially of the valve, said valve being formed having flanged ends, the incontiguous cords being arranged longitudinally of the valve being turned at the valve ends for integral embedment within its flanges, each flanged end of the pinch valve comprises a first elastomeric annulus being located proximate the ends of the resilient composition forming the valve, the cords arranged longitudinally of the valve extending through said annulus and being turned and maintained contiguous with the surface of said annulus, a second elastomeric annulus being integrally connected to said first annulus, at least one fabric reinforced annulus disposed intermediate the first and second elastomeric annuluses, and said second annulus being integrally connected to said first annulus thereby embedding the turned portion of said longitudinal cords and the fabric annulus integrally into a flange.

4. In a reinforced pinch valve for use in controlling the flow of materials therethrough, said valve being formed of a resilient composition capable of being compressed to curtail flow of materials therethrough, said valve capable of reacquiring its initial integrity after discontinuance of compression, a series of reinforcing cords of which select cords are arranged approximately parallel to each other being embedded within said resilient composition, the parallel reinforcing cords of the valve being free of contiguous contact with each other thereby reducing the incidence of their mutual sheer when the valve is compressed, certain of said parallel reinforcing cords being arranged circumferentially of the valve, said valve being formed having flanged ends, the incontiguous cords arranged longitudinally of the valve being turned at the valve ends for integral embedment within its flanges, each flanged end of the pinch valve comprises a first elastomeric annulus being located proximate the ends of the resilient composition forming the valve, the cords arranged longitudinally of the valve extending through said annulus and being turned and maintained contiguous with the surface of said annulus, a second elastomeric annulus being integrally connected to said first annulus, a pair of fabric reinforced annuluses disposed intermediate the first and second elastomeric annuluses, the strands of one fabric annulus being disposed angularly with respect to the strands of the second fabric annulus, said second elastomeric annulus being integrally connected to said first elastomeric annulus thereby embedding said longitudinal cords and the pair of fabric annuluses integrally into a flange.

5. In a reinforced pinch valve for use in controlling the flow of materials therethrough, said valve being of the type having a body portion and integrally connecting flanged ends, the body portion of the valve being formed of a resilient composition capable of being compressed to curtail flow of materials therethrough, certain of said reinforcing cords being arranged longitudinally of the valve, and the remaining of the approximately parallel reinforcing cords being arranged circumferentially in the body portion of said valve, each flanged end of the pinch valve comprising a first elastomeric annulus being located proximate the ends of the resilient composition forming the body portion of said valve, only the incontiguous cords arranged longitudinally of the valve extending through said annulus and being turned and maintained contiguous with the surface of said annulus, a second elastomeric annulus being integrally connected to said first annulus thereby embedding the turned portion of the longitudinal cords into the flange.

6. In a reinforced pinch valve for use in controlling the flow of materials therethrough, said valve being of the type formed having a body portion formed of a resilient composition and incorporating flanged ends thereof, said valve capable of being compressed to curtail flow of materials therethrough, said valve capable of reacquiring its initial integrity after discontinuance of compression, a series of reinforcing cords of which select cords are arranged approximately parallel to each other being embedded within the resilient composition forming said body portion of the valve, the parallel reinforcing cords of the valve being free of contiguous contact with each other thereby reducing the incidence of their mutual sheer when the valve is compressed, certain of said parallel reinforcing cords being arranged longitudinally of the valve, the remaining of the approximately parallel reinforcing cords being arranged circumferentially within the body portion of said valve, and only the incontiguous cords arranged longitudinally of the valve being turned at the valve ends for integral embedment within its flanges.

7. The invention of claim 6 wherein each flanged end of the pinch valve comprises a first elastomeric annulus being located proximate the end of the resilient composition forming the body portion of the valve, only the cords arranged longitudinally of the valve extending through said annulus and being turned and maintained contiguous with the surface of said annulus, and a second elastomeric annulus being integrally connected to said first annulus thereby embedding said longitudinal cords into the flange.

8. In combination with a pair of valve actuators arranged diametrically of a resilient pinch valve maintained therebetween, each actuator capable of simultaneously compressing said valve approximately half of its diameter to curtail flow of materials therethrough, said actuators capable of withdrawing their compression thereby allowing said valve to reacquire its initial integrity, said valve being formed having a body portion formed of resilient composition and incorporating flanged ends, a plurality of incontiguous reinforcing cords embedded within the body portion of said valve to enhance its strength, a portion of said reinforcing cords being arranged approximately parallel to each other thereby reducing the incidence of their mutual shear, certain of said reinforcing cords being arranged longitudinally of the body portion of said valve, the remaining of the approximately parallel reinforcing cords being arranged circumferentially along the length of the body portion of said valve, and only the incontiguous cords arranged longitudinally of the valve being turned at its ends for integral embedment within its flanges.

* * * * *